United States Patent [19]

Takahashi

[11] Patent Number: 4,632,519

[45] Date of Patent: Dec. 30, 1986

[54] ZOOM LENS INCLUDING A WIDE ANGLE OF VIEW

[75] Inventor: Tomowaki Takahashi, Tokyo, Japan

[73] Assignee: Nippon Kogaku K.K., Tokyo, Japan

[21] Appl. No.: 626,989

[22] Filed: Jul. 2, 1984

[30] Foreign Application Priority Data

Jul. 6, 1983 [JP] Japan .................. 58-122856
Jul. 6, 1983 [JP] Japan .................. 58-122857

[51] Int. Cl.⁴ .............................................. G02B 15/14
[52] U.S. Cl. ............................................................ 350/427
[58] Field of Search ............................................. 350/427

[56] References Cited

U.S. PATENT DOCUMENTS 4,359,270 11/1982 Okudaira ................. 350/427

FOREIGN PATENT DOCUMENTS 58-78114 4/1983 Japan .

Primary Examiner—John K. Corbin
Assistant Examiner—Rebecca D. Gass
Attorney, Agent, or Firm—Shapiro and Shapiro

[57] ABSTRACT

A zoom lens including a wide angle of view has, in succession from the object side, a first lens group of positive refractive power, a second lens group of negative refractive power, a third lens group of positive refractive power and a fourth lens group of positive refractive power. When zooming is to be effected from the wide angle end to the telephoto end, the first lens group and the fourth lens group are monotonously moved toward the object side and at the same time, the third lens group is monotonously moved toward the object side by an amount of movement 0.4–0.8 time as great as the amount of movement of the first and fourth lens groups and the second lens group is moved toward the object side in the vicinity at least the wide angle end. The zoom lens satisfies the following condition:

$4.5 < f_1/-f_2 < 6.5$ where $f_1$ is the focal length of the first lens group and $f_2$ is the focal length of the second lens group.

15 Claims, 27 Drawing Figures

ZOOM LENS INCLUDING A WIDE ANGLE OF VIEW

BACKGROUND OF THE INVENTION

1. Field of the Invention

This invention relates to a zoom lens including a wide angle of view exceeding 60° at maximum and having a relatively wide magnification change area from the so-called wide angle to the telephoto.

2. Description of the Prior Art

In recent years, various zoom lenses of this type for 35 mm still cameras have been proposed and they have a tendency toward higher magnification changes. The present invention is directed to a high magnification change zoom of the order of f=35-200 and of a zoom magnification change ratio of the order of 5.7 times, but it involves a considerable difficulty to provide a lens including a wide angle of such a high magnification change range. First, to achieve a high magnification change while including a wide angle, the focusing group which is most adjacent to the object side must be formed by a positive group. Therefore, as the disadvantages of the positive focusing group, mention may be made of two points, i.e., that the close distance cannot be made very short and that the fluctuation of aberrations resulting from short distance focusing (hereinafter simply referred to as the short distance fluctuation) is great. The shortening of the close distance can be achieved to a certain degree if the diameter of the forward lens is made large or if the focal length of the forward lens is made short, but in that case, compactness of the lens and reduction of aberrations fluctuation will unavoidably be sacrificed. Also, to realize a high magnification change rate zoom lens by a certain degree of compact lens system, the power of each magnification changing group must unavoidably be made strong, but if this is done, spherical aberration will be aggravated corresponding to the minimum F-number at the telephoto end and further, the fluctuation of various aberrations during a magnification change (hereinafter simply referred to as the magnification change fluctuation) will become great and the manner of variation will become complicated.

For example, generally, the fluctuation of the meridional image plane at 15 mm corresponding to 70% of the image height exhibits an inverted S-shaped movement such as negative for f=35, positive for f=50, 0 for f=85, negative for f=135 and 0 for f=200, and as regards spherical aberration, at the value of 70% of the opening value, it exhibits an S-shaped movement such as greatly negative for f=35, somewhat negative for f=50, 0 for f=85, positive for f=135 and negative for f=200. Therefore, at several locations in the magnification change range, it is difficult for the image plane to be coincident with spherical aberration. Particularly, in the vicinity of f=50 and in the vicinity of f=135, spherical aberration and the marginal image plane deviate greatly from each other and therefore, it is difficult to obtain always a flat image over the entire magnification change range.

Also, as regards the short distance fluctuation of aberrations, there is a nature contradictory to the desire to make the lens system compact and such fluctuation is very difficult to correct and it is the usual practice to solve the problem by allotting the remaining aberrations between the infinity photographing condition and the close distance photographing condition. Accordingly, in zoom lenses for 35 mm still cameras having three or more times f=35 mm beginning from the wide angle, the demand for compactness of the lenses is strong in spite of the fact that the aberration fluctuation at a short distance is great, and a certain degree of aberration fluctuation is unavoidable.

However, in high magnification zoom lenses, not only the close distance fluctuation of the image plane becomes great, but also the image plane fluctuation by a magnification change becomes appreciable as described above. Therefore, actually, the short distance fluctuation and the magnification change fluctuation overlap each other and the image plane fluctuation becomes greater and thus, the image performance becomes irregular within the range of zoom magnification change. The image plane fluctuation by a magnification change cannot be corrected in the limited construction of the magnification changing group unless the zoom lens system itself is made large or unless glass of high refractive index is adopted by a large margin to make the radius of curvature of each lens surface greater, but even where this image plane fluctuation by a magnification change can be held down to a good value, it is very difficult to correct the short distance fluctuation, and it has been nearly impossible to correct the two at the same time.

This short distance fluctuation of the image plane becomes greater as the zoom lens is of a higher magnification and its telephoto end is of a longer focus, and cannot be corrected only by improvement of the focusing group (usually the first lens group) which is the main cause of the occurrence of such fluctuation. This short distance fluctuation can be greatly improved if the so-called floating system of the focusing group is adopted in which the focusing group is divided into two lens groups and the interval between the two lens groups is somewhat varied to effect correction, but in that case, the number of lenses will be increased, and this in turn will possibly lead to bulkiness of the lens system. If the number of lenses is limited, the deterioration of the image performance by the increase in spherical aberration and coma resulting from the variation in the interval between the lenses will be brought about. Further, in such case, the movable groups will be increased in number and therefore, the working accuracy of the lens barrel will be influenced and eccentricity, tilting etc. may occur to deteriorate the image performance.

SUMMARY OF THE INVENTION

It is an object of the present invention to provide a zoom lens including a wide angle of view which has a wide magnification change area and yet which is compact and moreover has an excellent imaging performance over the entire magnification change range.

It is a further object of the present invention to provide a zoom lens which includes a wide angle of view and has a relatively wide magnification change area and which is compact and yet can well correct the magnification change fluctuation and the short distance fluctuation of aberration, particularly the fluctuation of curvature of image field by focusing.

The invention will become fully apparent from the following detailed description thereof taken in conjunction with the accompanying drawings.

DESCRIPTION OF THE PREFERRED EMBODIMENTS

Figure 1:
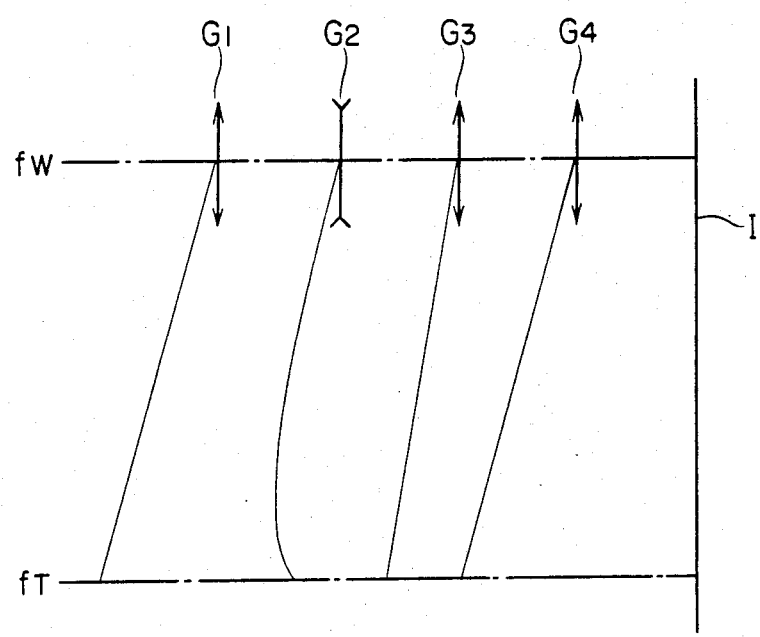
FIG. 1 shows the movement locus of each lens group of a zoom lens according to the present invention for a magnification change.

The zoom lens according to the present invention, as shown in the basic construction view of FIG. 1, has, in succession from the object side, a first lens group G1 of positive refractive power, a second lens group G2 of negative refractive power, and a third lens group G3 of positive refractive power, these three lens groups as a whole being constructed so as to be substantially afocal, and further has a fourth lens group G4 of positive refractive power on the image plane I side of these groups, and when zooming is effected from the wide angle end fW to the telephoto end fT, the first lens group G1 and the fourth lens group G4 may be monotonously moved toward the object side substantially by the same amount and the third lens group G3 may be monotonously moved toward the object side at a rate of about 0.4–0.8 of the movement of the first lens group G1 while, at the same time, the second lens group G2 may be moved toward the object side in at least the vicinity of the wide angle end. In such a basic construction, as shown in the applicant's Japanese Laid-open Patent Application No. 78114/1983, the second lens group is designed to be moved toward the object side in the vicinity of the wide angle end and therefore, there is the effect that the oblique light flux somewhat in the intermediate state from the wide angle end can be brought close to the center of the lens, and thus, reduction in diameter of the forward lens can be realized. Also, in such a zooming system, the entire lens system is moved for a magnification change and therefore, the requirement for the accuracy of the lens barrel structure becomes severe, but not only the diameter of the forward lens can be reduced but also the lens system can be made compact at the wide angle end and yet the telephoto ratio can be made great at the telephoto end, and this is advantageous in aberration correction.

In the above-described basic construction of the present invention, to cope with high magnification change zoom of the order of 5.7 times, the focal length $f_1$ of the first lens group and the focal length $f_2$ of the second lens group must satisfy the following condition:

$$4.5 < f_1/-f_2 < 6.5 \tag{1}$$

In this case, the focal length $f_1$ of the first lens group is made short relative to the focal length of the telephoto end of the entire system to make the entire system compact and therefore, short distance fluctuation and magnification change fluctuation are aggravated, but both of these fluctuations are suppressed by making the focal length $f_2$ of the second lens group relatively long. If the upper limit of the above condition is exceeded, the system will become too bulky and, if the lower limit of the above condition is not reached, both of short distance fluctuation and magnification change fluctuation will be aggravated. If within condition (1), there can be obtained a lens system which is compact and in which the aberration fluctuation is small.

In such basic construction of the present invention, it is desirable that the construction of each lens group be as follows. That is, it is desirable that as shown, for example, in FIG. 4, the first lens group G1 have a positive first lens component L1 comprising a negative meniscus lens and a biconvex positive lens cemented together, and a second lens component L2 which is a positive meniscus lens having its convex surface facing the object side, the second lens group G2 have, in succession from the object side, a third lens component L3 which is a negative meniscus lens having its convex surface facing the object side, a fourth lens component L4 which is a cemented negative lens component, and a fifth lens component L5 which is a cemented negative lens having its surface of sharper curvature facing the object side, and the third lens group G3 have, in succession from the object side, a sixth lens component L6 which is a positive lens having its surface of sharper curvature facing the image side, a seventh lens component L7 which is a biconvex positive lens, and an eighth lens component L8 which is a negative meniscus lens having its convex surface facing the image side. Also, it is desirable that the fourth lens group G4 have a ninth lens component L9 which is a biconvex positive lens, a tenth lens component L10 which is a positive lens having its surface of sharper curvature facing the object side, an eleventh lens component L11 which is a biconcave lens having its surface of sharper curvature facing the image side, a twelfth lens component L12 which is a positive lens having its surface of sharper curvature facing the image side, and a thirteenth lens component L13 which is a positive lens comprising a biconvex positive lens and a negative meniscus lens having its convex surface facing the image side cemented together. By further providing a cemented surface in the lens components of each lens group, better correction of aberrations can be accomplished.

In the present invention, to further correct the magnification change fluctuation of aberrations, it is desirable that the following condition be satisfied:

$$n_5 > 1.8 \quad n_6 > 1.8 \tag{2}$$

where $n_5$ and $n_6$ are the refractive indices of the positive lens and the negative lens, respectively, forming the fourth lens group L4 as the cemented negative lens in the second lens group G2. If this condition is departed from, the fluctuation of coma and the fluctuation of the image plane during a magnification change will become great and the aberration correction by a simple construction will become difficult.

Also, if the focal length on the telephoto side is f=200 mm, the secondary spectrum of color will become great and the introduction of abnormal dispersion glass will become necessary. Accordingly, in order to make the radius of curvature of the cemented surface of the first lens component L1 great and minimize the center thickness of the cemented lens, it is desirable to introduce abnormal dispersion glass which will satisfy the following condition:

$$80 < \nu_2 \tag{3}$$

where $\nu_2$ is the Abbe number of the positive lens forming this cemented first lens component L1, and the blur of color on the telephoto side can be sharply decreased. If condition (3) is departed from, the chromatic aberration on the telephoto side cannot be tolerated the image performance will be aggravated.

Also, to well correct the spherical aberration in the entire magnification change area, particularly, on the telephoto side, it is desirable that the following condition be satisfied:

$$-3.6 < q_6 < -0.5 \tag{4}$$

where $q_6$ is the shape factor of the sixth lens component L6 of the third lens group G3 which is positioned most adjacent to the object side. It is to be understood that the shape factor q is defined by $$q = \frac{rb + ra}{rb - ra},$$

where ra and rb are the radii of curvature of the lens surfaces of that lens which are adjacent to the object side and the image side, respectively. If the upper limit of this condition is exceeded, the bending of spherical aberration toward the positive side will become strong and the resultant image will have many flares. Also, if the lower limit of this condition is not reached, spherical aberration at aperture size of 70% to 100% will be increased toward the negative side at the wide angle end and will become far apart from the form of full correction and the bending toward the negative side will become strong at the telephoto end and this will further move toward the negative side when the short distance in-focus state is reached, and this is inconvenient.

Further, to make the balance of the coma in the states in which the focal length f of the entire system is f=35 and f=50 into a good value, it is desirable that the following conditions be satisfied:

$$0.5 < q_{10} < 5 \tag{5}$$

$$-1 < q_{11} < 0.0 \tag{6}$$

where $q_{10}$ and $q_{11}$ are the shape factors of the tenth lens component L10 and the eleventh lens component L11, respectively, in the fourth lens group G4.

If the upper limits of conditions (5) and (6) are exceeded, there will appear the inward coma tendency and, if the lower limits of these conditions are not reached, there will appear the outward coma tendency. Particularly, coma of the 70% image height in the vicinity of f=35 is liable to become the inward coma, coma of the 70% image height in the vicinity of f=50 is liable to become the outward coma, and coma of the 70% image height in the vicinity of f=135 is liable to become the inward coma.

Figure 2:
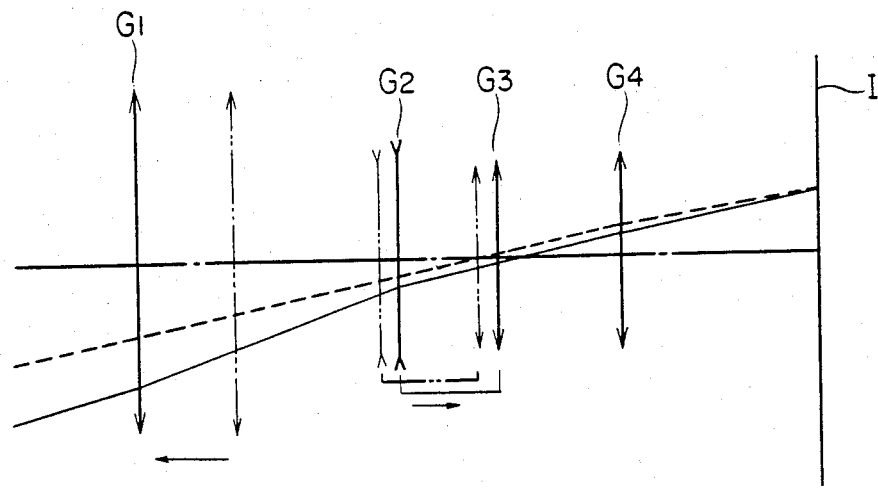
FIG. 2 shows the focusing system according to the present invention.

Now, in the above-described construction of the present invention, when focusing to a short distance object is to be effected, it is effective to move the first lens group G1 toward the object side along the optic axis relative to the image plane I and move the second lens group G2 and the third lens group G3 together toward the image side along the optic axis, as shown in FIG. 2. In FIG. 2, the principal ray of the oblique light flux during infinity in-focus is indicated by dotted line and the principal ray of the oblique light flux during short distance in-focus is indicated by solid line, and the arrangement during infinity in-focus of the first, second and third lens groups G1, G2 and G3 moved during focusing is indicated by dots-and-dash lines. Also, in FIG. 3, to make the present invention easy to understand, there are shown the marginal rays from the on-axis infinite object point and the off-axis infinite object point during the infinity in-focus of the zoom lens of the present invention.

According to such a basic construction for focusing, not only the short distance fluctuation of the curvature of image field is greatly decreased, but also the second lens group G2 and the third lens group G3 which are near the first lens group G1 are moved while keeping the construction for magnification change and therefore, the structure of the lens barrel becomes simple. Also, both of the second lens group G2 and the third lens group G3 are the movable groups for magnification change and therefore, the possibility of increasing mechanical errors such as eccentricity and tilting in the movement for focusing is small.

Figure 3:
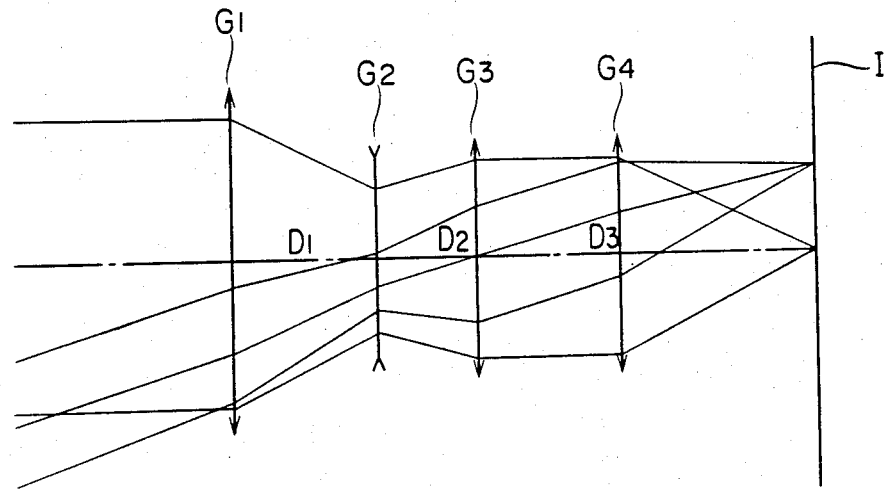
FIG. 3 shows the basic optical path in the infinity in-focus state of the zoom lens according to the present invention.

Thus, the present invention corrects any variation in curvature of image field which may occur for the axial movement of the forward lens when focusing to a short distance object is effected, thereby maintaining a good image performance over the entire image plane, but if the aberrations other than curvature of image field such as spherical aberration and coma, fluctuate due to the variation in interval, said correction will not make sense. Therefore, it becomes important that there are no great fluctuations of spherical aberration and coma due to the variation in interval. Also, any variation in focal length caused by the variation in interval is inconvenient and thus, it is also important that there is no fluctuation of the focal length. To meet these requirements at the same time, as shown in FIG. 3, the interval between the third lens group G3 and the fourth lens group G4 may be made into a parallel light flux system. That is, for this purpose, it is necessary to design the first lens group G1 to the third lens group G3 such that they are an afocal system during infinity in-focus. By doing so, even if the second lens group G2 and the third lens G3 are moved together to thereby vary the interval between the third and fourth lens groups, the focal length will not vary and spherical aberration will not vary. Coma will somewhat vary, but it is a variation based on the variation in curvature of image field and therefore, the intended purpose can be sufficiently achieved.

To make the interval between the third lens group and the fourth lens group into a parallel light flux system and afocal-couple them, a zoom magnification changing system must be constructed by a power arrangement which keeps the following relation:

$$\frac{1}{f_1 - D_1} + \frac{1}{f_3 - D_2} = -\frac{1}{f_2},$$

where $f_1$ is the focal length of the first lens group, $f_2$ is the focal length of the second lens group, $f_3$ is the focal length of the third lens group, and $D_1$ and $D_2$ are the principal point intervals between the respective groups as shown in FIG. 3. It is desirable that this relation be kept accurately, but even if the above equation is somewhat departed from, the amounts of variation in various aberrations resulting from the variation in the interval between the afocal-coupled groups are very slight and therefore, no great variation occurs in spherical aberration and focal length, and this is sufficiently satisfactory in practice.

Some examination from the aberration theory will now be applied to the fluctuation of curvature of image field resulting from a magnification change. If tertiary spherical aberration is I and coma is II and astigmatism is III and the distance from the position of the stop of the constructed optical system to the optical portion group which is the object is l, and assuming that the stop has been moved by $\Delta l$ from this optical portion group, the aberration fluctuations occurring therefrom are given as follows:

$$\Delta I = 0 \tag{7}$$

$$\Delta II = -\alpha \Delta l I \tag{8}$$

$$\Delta III = -2\alpha \Delta l II + (\alpha \Delta l)^2 I \tag{9}$$

where $\alpha$ is a substantially predetermined proportion constant.

In the present invention, it is desirable that the stop be provided integrally with the third lens group G3, particularly between the second lens group G2 and the third lens group G3, but in this case, the distance of the first lens group G1 from the stop is varied by the movement of the first lens group by focusing and therefore, similar aberration fluctuations occur. Actually, in addition to this, there are the influence of the lens group intervening between the first lens group and the stop and the influence of the variation in the object distance and thus, the aberration fluctuations are complicated, but most of the aberrations which create the fluctuation of the image plane can be regarded as being due to equation (9). The present invention has found that such aberration fluctuations by focusing can be corrected by moving the second and third lens groups together.

The aberration fluctuations during focusing by the movement of the first lens group can be corrected by moving the fourth lens group lying rearwardly of the stop at the same time with and in the same direction as the first lens group, but when the fourth lens group is moved, the back focal length is also varied, and this is not practical. It has therefore been found that a function substantially equivalent to the aberration correction by the fourth lens group can be achieved by integral movement of the second lens group and the third lens group, and the third lens group and the fourth lens group are afocal-coupled so as not to aggravate the fluctuations of the other aberrations than curvature of image field.

In such correction of the aberration fluctuations during focusing by the present invention, it is desirable that the following condition be satisfied:

$$0.1S \leq \Delta T \leq 0.35S \tag{10},$$

where S is the amount of movement of the first lens group toward the object side and $\Delta T$ is the amount of integral movement of the second and third lens groups toward the image side. If the lower limit of this condition (10) is departed from, the effect of the aberration correction during focusing will become poor and, if the upper limit of this condition is exceeded, over-correction will occur at the wide angle end and therefore the imaging performance will be aggravated.

Some embodiments of the present invention will now be described. Any of first to third embodiments of the present invention is a zoom lens for a 35 mm still camera having a focal length of 35-200 mm, a zoom ratio of 5.7 and F-number of the order of 3.5-4.5. A fourth embodiment is a zoom lens having a focal length of 35-105 mm, a zoom ratio of 3 and F-number of the order of 3.5-4.5.

Figure 4:
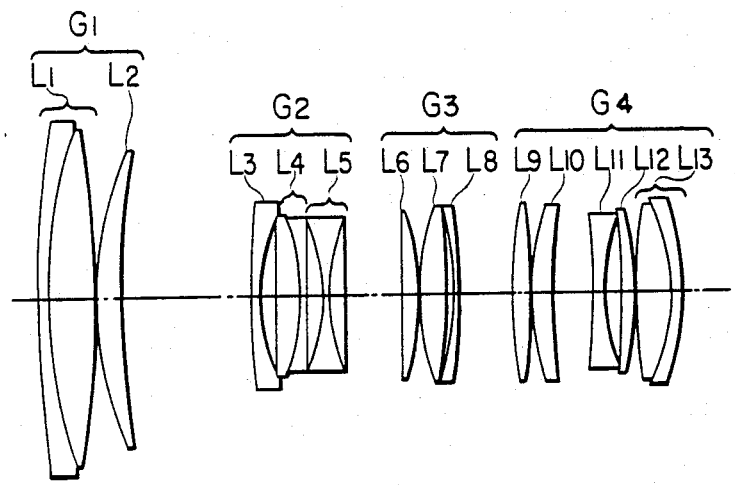
FIG. 4 shows the lens construction of first and second embodiments of the present invention.
Figure 5:
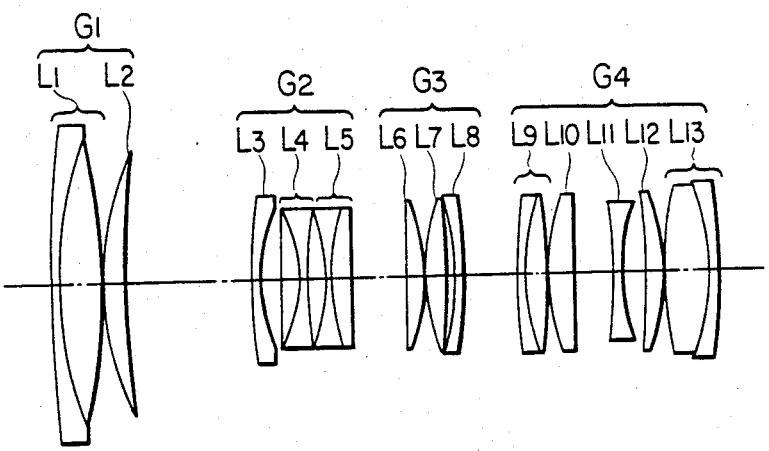
FIG. 5 shows the lens construction of a third embodiment of the present invention.
Figure 6:
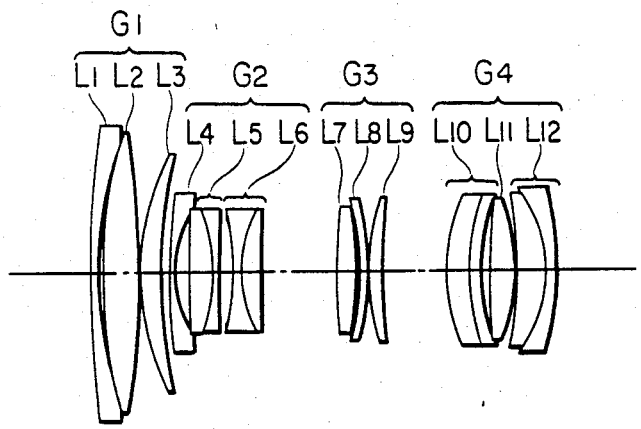
FIG. 6 shows the lens construction of a fourth embodiment of the present invention.

The first embodiment has a lens construction as shown in FIG. 4 and described previously, and the lens construction of the second embodiment is substantially identical to the lens construction of the first embodiment shown in FIG. 4 but differs therefrom in lens center thicknesses and radii of curvature. The lens construction of the third embodiment, as shown in FIG. 5, differs from the lens construction of the first embodiment in that the foremost positive lens component L9 in the fourth lens group G4 is a cemented lens for achromatism. The fourth embodiment is of a construction as shown in FIG. 6 and has a focal length of 35-105 mm, a zoom ratio of 3 and F-number of 3.5-4.5.

The numerical data of the first to fourth embodiments will be shown in Tables 1, 2, 3 and 4 below. In each of these tables, the values are shown in succession from the object side and the suffix numbers represent the order from the object side.

TABLE 1

(First Embodiment)

Focal length f = 35~200  Zoom ratio 5.7  F-number 3.5~4.5  Image height y = 21.6

| Radius of curvature | | Center thickness and air space | | Refractive index | | Abbe number | | |
|---|---|---|---|---|---|---|---|---|
| r1 | 219.97 | d1 | 1.3 | n1 | 1.805 | ν1 | 25.4 | } L1 } G1 |
| r2 | 69.27 | d2 | 8.0 | n2 | 1.498 | ν2 | 82.3 | |
| r3 | −129.41 | d3 | 0.1 | | | | | |

TABLE 1-continued

| | | | | | | | | |
|---|---|---|---|---|---|---|---|---|
| r4 | 50.60 | d4 | 4.0 | n3 | 1.797 | ν3 | 45.5 | L₂ |
| r5 | 129.98 | d5 | (variable) | | | | | |
| r6 | 121.12 | d6 | 1.3 | n4 | 1.903 | ν4 | 35.8 | L₃ |
| r7 | 23.54 | d7 | 2.8 | | | | | |
| r8 | 301.35 | d8 | 4.2 | n5 | 1.861 | ν5 | 23.0 | L₄ |
| r9 | −28.77 | d9 | 1.1 | n6 | 1.877 | ν6 | 38.1 | |
| r10 | 189.86 | d10 | 2.7 | | | | | |
| r11 | −25.19 | d11 | 1.0 | n7 | 1.713 | ν7 | 54.0 | L₅ |
| r12 | 32.36 | d12 | 2.8 | n8 | 1.861 | ν8 | 23.0 | |
| r13 | 682.84 | d13 | (variable) | | | | | |
| r14 | −260.75 | d14 | 3.3 | n9 | 1.517 | ν9 | 64.1 | L₆ |
| r15 | −41.85 | d15 | 0.1 | | | | | |
| r16 | 37.74 | d16 | 4.5 | n10 | 1.519 | ν10 | 70.1 | L₇ |
| r17 | −59.29 | d17 | 1.0 | | | | | |
| r18 | −41.97 | d18 | 1.0 | n11 | 1.861 | ν11 | 23.0 | L₈ |
| r19 | −93.35 | d19 | (variable) | | | | | |
| r20 | 74.81 | d20 | 3.0 | n12 | 1.517 | ν12 | 64.1 | L₉ |
| r21 | −108.74 | d21 | 0.1 | | | | | |
| r22 | 42.60 | d22 | 3.9 | n13 | 1.620 | ν13 | 60.3 | L₁₀ |
| r23 | 86.90 | d23 | 7.0 | | | | | |
| r24 | −103.53 | d24 | 2.0 | n14 | 1.796 | ν14 | 41.0 | L₁₁ |
| r25 | 37.43 | d25 | 2.5 | | | | | |
| r26 | −253.20 | d26 | 2.5 | n15 | 1.517 | ν15 | 64.1 | L₁₂ |
| r27 | −49.39 | d27 | 0.1 | | | | | |
| r28 | 81.93 | d28 | 6.5 | n16 | 1.518 | ν16 | 59.0 | L₁₃ |
| r29 | −23.95 | d29 | 1.0 | n17 | 1.788 | ν17 | 47.5 | |
| r30 | −45.57 | Bf | | | | | | |

L₂ (G₁ continued); L₃, L₄, L₅ ∈ G₂; L₆, L₇, L₈ ∈ G₃; L₉, L₁₀, L₁₁, L₁₂, L₁₃ ∈ G₄

| | $f_W = 36.12$ | $f_M = 84.0$ | $f_T = 193.96$ |
|---|---|---|---|
| d5 | 2.30 | 21.71 | 36.79 |
| d13 | 18.92 | 9.25 | 0.54 |
| d19 | 19.11 | 9.37 | 3.00 |
| Stop: ahead of L₉ | 0.8 | 0.8 | 0.8 |
| Back focal length: Bf | 53.15 | 78.12 | 94.41 |

TABLE 2

(Second Embodiment)

Focal length f = 35~200    Zoom ratio 5.7    F-number 3.5~4.5    Image height y = 21.6

| | Radius of curvature | | Center thickness and air space | | Refractive index | | Abbe number | | |
|---|---|---|---|---|---|---|---|---|---|
| r1 | 158.9 | d1 | 1.5 | n1 | 1.805 | ν1 | 25.4 | L₁ | |
| r2 | 64.1 | d2 | 3.0 | n2 | 1.498 | ν2 | 82.3 | | G₁ |
| r3 | −138.8 | d3 | 0.1 | | | | | | |
| r4 | 47.2 | d4 | 4.3 | n3 | 1.670 | ν3 | 47.1 | L₂ | |
| r5 | 127.2 | d5 | (variable) | | | | | | |
| r6 | 133.1 | d6 | 1.3 | n4 | 1.903 | ν4 | 35.8 | L₃ | |
| r7 | 23.6 | d7 | 2.9 | | | | | | |
| r8 | 154.6 | d8 | 4.2 | n5 | 1.805 | ν5 | 25.4 | L₄ | |
| r9 | −32.5 | d9 | 1.1 | n6 | 1.804 | ν6 | 46.4 | | G₂ |
| r10 | 117.2 | d10 | 2.7 | | | | | | |
| r11 | −25.4 | d11 | 1.0 | n7 | 1.713 | ν7 | 54.0 | L₅ | |
| r12 | 30.8 | d12 | 2.8 | n8 | 1.861 | ν8 | 23.0 | | |
| r13 | 483.9 | d13 | (variable) | | | | | | |
| r14 | −486.8 | d14 | 3.3 | n9 | 1.517 | ν9 | 64.1 | L₆ | |
| r15 | −39.4 | d15 | 0.1 | | | | | | |
| r16 | 36.2 | d16 | 4.5 | n10 | 1.519 | ν10 | 70.1 | L₇ | G₃ |
| r17 | −84.7 | d17 | 0.8 | | | | | | |
| r18 | −47.7 | d18 | 1.0 | n11 | 1.861 | ν11 | 23.0 | L₈ | |
| r19 | −121.8 | d19 | (variable) | | | | | | |
| r20 | 72.5 | d20 | 3.0 | n12 | 1.517 | ν12 | 64.1 | L₉ | |
| r21 | −115.7 | d21 | 0.1 | | | | | | |
| r22 | 46.8 | d22 | 3.9 | n13 | 1.620 | ν13 | 60.3 | L₁₀ | |
| r23 | 107.7 | d23 | 7.0 | | | | | | |
| r24 | −89.7 | d24 | 2.0 | n14 | 1.796 | ν14 | 41.0 | L₁₁ | |
| r25 | 37.6 | d25 | 2.5 | | | | | | G₄ |
| r26 | −298.2 | d26 | 2.5 | n15 | 1.567 | ν15 | 64.1 | L₁₂ | |
| r27 | −47.4 | d27 | 0.1 | | | | | | |
| r28 | 93.5 | d28 | 6.5 | n16 | 1.518 | ν16 | 60.3 | L₁₃ | |
| r29 | −24.6 | d29 | 1.3 | n17 | 1.788 | ν17 | 47.5 | | |
| r30 | −43.4 | Bf | | | | | | | |

| | $f_W = 36.1$ | $f_M = 84.0$ | $f_T = 194.0$ |
|---|---|---|---|
| d5 | 1.27 | 20.68 | 35.76 |

TABLE 2-continued

| | | | |
|---|---|---|---|
| d13 | 19.27 | 9.60 | 0.89 |
| d19 | 17.34 | 7.60 | 1.23 |
| Stop: ahead of $L_9$ | 0.8 | 0.8 | 0.8 |
| Back focal length: Bf | 54.2 | 79.17 | 95.46 |

TABLE 3

(Third Embodiment)

Focal length f = 35~200  Zoom ratio 5.7  F-number 3.5~4.5  Image height y = 21.6

| | Radius of curvature | | Center thickness and air space | | Refractive index | | Abbe number | | |
|---|---|---|---|---|---|---|---|---|---|
| r1 | 268.4 | d1 | 1.3 | n1 | 1.805 | ν1 | 25.4 | $L_1$ | |
| r2 | 69.1 | d2 | 7.5 | n2 | 1.498 | ν2 | 82.3 | | $G_1$ |
| r3 | −122.2 | d3 | 0.1 | | | | | | |
| r4 | 49.8 | d4 | 3.6 | n3 | 1.840 | ν3 | 43.3 | $L_2$ | |
| r5 | 122.4 | d5 | (variable) | | | | | | |
| r6 | 101.9 | d6 | 0.9 | n4 | 1.903 | ν4 | 35.8 | $L_3$ | |
| r7 | 24.4 | d7 | 3.4 | | | | | | |
| r8 | 153.4 | d8 | 4.4 | n5 | 1.861 | ν5 | 23.0 | $L_4$ | $G_2$ |
| r9 | −21.9 | d9 | 0.9 | n6 | 1.877 | ν6 | 38.1 | | |
| r10 | 88.3 | d10 | 3.1 | | | | | | |
| r11 | −25.5 | d11 | 0.9 | n7 | 1.744 | ν7 | 45.1 | $L_5$ | |
| r12 | 38.5 | d12 | 3.7 | n8 | 1.861 | ν8 | 23.0 | | |
| r13 | −591.6 | d13 | (variable) | | | | | | |
| r14 | −4145.0 | d14 | 3.8 | n9 | 1.498 | ν9 | 82.3 | $L_6$ | |
| r15 | −40.1 | d15 | 0.1 | | | | | | |
| r16 | 36.3 | d16 | 4.1 | n10 | 1.498 | ν10 | 82.3 | $L_7$ | $G_3$ |
| r17 | −114.4 | d17 | 1.5 | | | | | | |
| r18 | −44.1 | d18 | 1.0 | n11 | 1.861 | ν11 | 23.0 | $L_8$ | |
| r19 | −80.9 | d19 | (variable) | | | | | | |
| r20 | 119.0 | d20 | 1.3 | n12 | 1.767 | ν12 | 46.8 | $L_9$ | |
| r21 | 37.3 | d21 | 4.2 | n13 | 1.517 | ν13 | 64.1 | | |
| r22 | −79.6 | d22 | 0.1 | | | | | | |
| r23 | 36.9 | d23 | 4.5 | n14 | 1.620 | ν14 | 60.3 | $L_{10}$ | |
| r24 | 0.0 | d24 | 7.0 | | | | | | |
| r25 | −96.8 | d25 | 1.0 | n15 | 1.773 | ν15 | 49.4 | $L_{11}$ | $G_4$ |
| r26 | 34.9 | d26 | 4.2 | | | | | | |
| r27 | −179.9 | d27 | 3.4 | n16 | 1.518 | ν16 | 60.3 | $L_{12}$ | |
| r28 | −41.3 | d28 | 0.1 | | | | | | |
| r29 | 66.8 | d29 | 8.0 | n17 | 1.518 | ν17 | 58.9 | $L_{13}$ | |
| r30 | −34.5 | d30 | 1.0 | n18 | 1.797 | ν18 | 45.5 | | |
| r31 | −103.5 | Bf | | | | | | | |

| | $f_W = 36.1$ | $f_M = 84.0$ | $f_T = 194.0$ |
|---|---|---|---|
| d5 | 2.46 | 21.87 | 36.95 |
| d13 | 18.37 | 8.70 | −0.01 |
| d19 | 19.08 | 9.34 | 2.97 |
| Stop: ahead of $L_9$ | 0.8 | 0.8 | 0.8 |
| Back focal length: Bf | 48.53 | 73.50 | 89.79 |

TABLE 4

(Fourth Embodiment)

Focal length f = 35~105  Zoom ratio 3  F-number 3.5~4.5  Image height y = 21.6

| | Radius of curvature | | Center thickness and air space | | Refractive index | | Abbe number | | |
|---|---|---|---|---|---|---|---|---|---|
| r1 | 150.69 | d1 | 1.3 | n1 | 1.805 | ν1 | 25.3 | $L_1$ | |
| r2 | 58.13 | d2 | 0.4 | | | | | | |
| r3 | 66.23 | d3 | 6.2 | n2 | 1.603 | ν2 | 60.6 | $L_2$ | $G_1$ |
| r4 | −128.09 | d4 | 0.1 | | | | | | |
| r5 | 33.14 | d5 | 3.9 | n3 | 1.603 | ν3 | 60.6 | $L_3$ | |
| r6 | 67.54 | d6 | (variable) | | | | | | |
| r7 | 62.79 | d7 | 1.0 | n4 | 1.796 | ν4 | 45.5 | $L_4$ | |
| r8 | 17.07 | d8 | 3.0 | | | | | | |
| r9 | −213.87 | d9 | 3.5 | n5 | 1.805 | ν5 | 25.3 | $L_5$ | |
| r10 | −20.49 | d10 | 1.0 | n6 | 1.796 | ν6 | 45.5 | | $G_2$ |
| r11 | −194.15 | d11 | 2.7 | | | | | | |
| r12 | −21.48 | d12 | 1.0 | n7 | 1.713 | ν7 | 53.9 | $L_6$ | |
| r13 | 17.23 | d13 | 3.5 | n8 | 1.796 | ν8 | 40.9 | | |
| r14 | −696.58 | d14 | (variable) | | | | | | |
| r15 | 122.05 | d15 | 4.0 | n9 | 1.713 | ν9 | 53.9 | $L_7$ | |

TABLE 4-continued

| | | | | | | | | |
|---|---|---|---|---|---|---|---|---|
| r16 | −24.80 | d16 | 0.4 | | | | | |
| r17 | −21.54 | d17 | 1.0 | n10 | 1.805 | ν10 | 25.3 | L8 } G3 |
| r18 | −38.91 | d18 | 0.1 | | | | | |
| r19 | 35.07 | d19 | 2.0 | n11 | 1.568 | ν11 | 56.0 | L9 |
| r20 | 72.08 | d20 | (variable) | | | | | |
| r21 | 21.96 | d21 | 4.0 | n12 | 1.563 | ν12 | 60.8 } L10 | |
| r22 | 34.58 | d22 | 1.5 | n13 | 1.796 | ν13 | 45.5 | |
| r23 | 20.50 | d23 | 2.0 | | | | | |
| r24 | 104.25 | d24 | 4.0 | n14 | 1.518 | ν14 | 60.3 | L11 } G4 |
| r25 | −31.38 | d25 | 0.1 | | | | | |
| r26 | −95.95 | d26 | 5.5 | n15 | 1.563 | ν15 | 60.8 } L12 | |
| r27 | −16.37 | d27 | 1.4 | n16 | 1.796 | ν16 | 40.9 | |
| r28 | −45.88 | Bf | | | | | | |

| | $f_W = 36.2$ | $f_M = 60$ | $f_T = 103$ |
|---|---|---|---|
| d6 | 0.98 | 10.62 | 19.77 |
| d14 | 12.52 | 6.77 | 1.49 |
| d20 | 10.84 | 6.96 | 3.08 |
| Stop: ahead of L9 | 0.8 | 0.8 | 0.8 |
| Back focal length: Bf | 52.36 | 65.30 | 78.24 |

Figure 7:
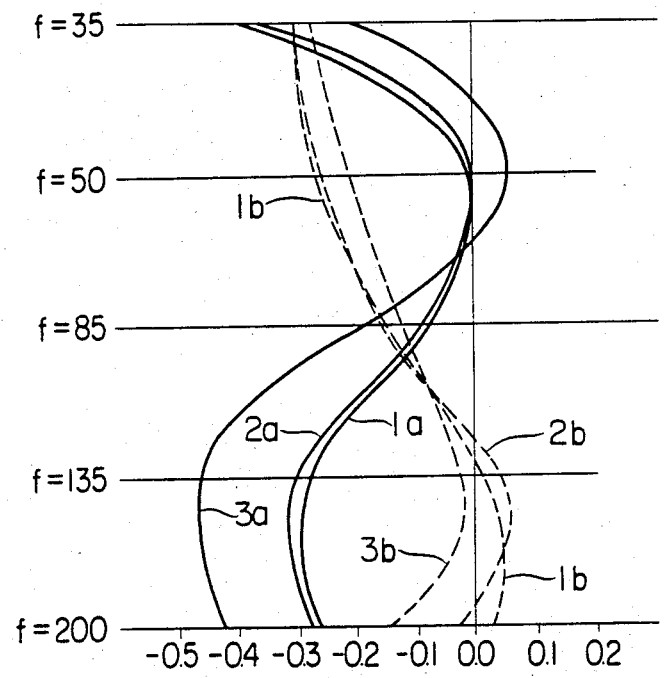
FIG. 7 shows the state of the fluctuation of the meridional image plane and the spherical aberration of the first, second and third embodiments by a magnification change.

In FIG. 7, there are shown the state of the magnification change fluctuation of the meridional image plane at 15 mm from the optic axis corresponding to 70% of the image height (solid lines) and the state of the magnification change fluctuation of the spherical aberration in 70% of the opening value (dotted lines). Curves 1a and 1b represent the magnification change fluctuations of the aberrations of the meridional image plane and the spherical plane of the first embodiment, curves 2a and 2b represent those of the second embodiment, and curves 3a and 3b represent those of the third embodiment. As shown, in each embodiment, the meridional image plane varies in the form of inverted S and the spherical aberration varies in the form of S, but the two are balanced sufficiently well in practice.

Figure 8:
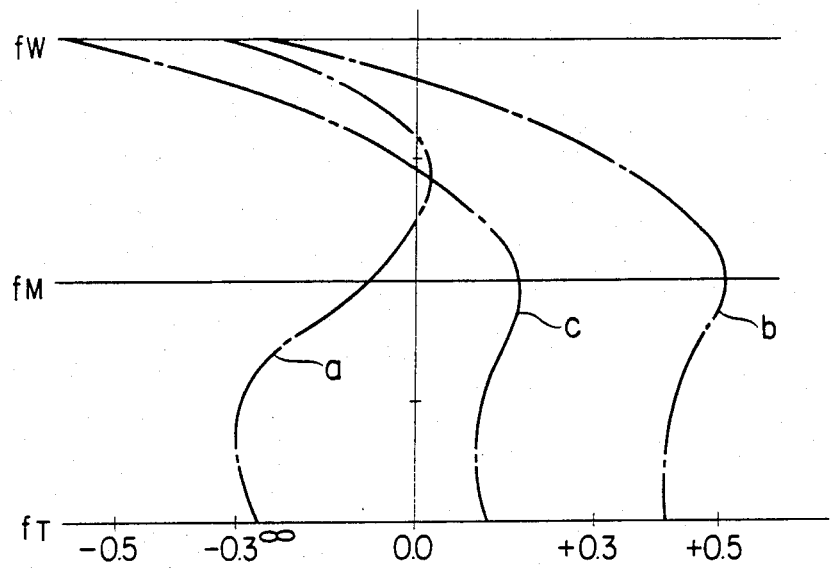
FIG. 8 shows the fluctuation of the meridional image plane at 70% of the angle of view by a magnification change and the fluctuation of the meridional image plane by the short distance in-focus in the first embodiment.

FIG. 8 shows the magnification change fluctuation from the wide angle side to the telephoto side in the meridional image plane of the 70% angle of view of the first embodiment. In FIG. 8, curve a refers to the state in a case where the object is at infinity, and this changes to the state of curve b when only the first lens group is moved by 4.4 mm toward the object side and focused to an object distance 1.6 m. As seen in FIG. 8, the short distance fluctuations at the wide angle end and the telephoto end are not uniform, and this is a phenomenon which has appeared due to a high magnification change of 5.7 times. In this case, there is a short distance fluctuation of the order of 0.6–0.9 at the telephoto end and at the medium portion, and there is a fluctuation of 0.05 at the wide angle end. When the zoom ratio is as high as 5.7 times as in this example, the fluctuation by a magnification change becomes complicated and exhibits an inverted S-shaped fluctuation as shown. Therefore, correction of not only the magnification change fluctuations of various aberrations but also the short distance fluctuation becomes more difficult. Curve c refers to the state in a case where during focusing to the same object, the second and third lens groups have been moved by 0.7 mm toward the image side at the same time by the present invention so that the short distance fluctuation at the telephoto end is corrected as much as possible while the fluctuation at the wide angle end is not too much over-corrected.

Figure 9:
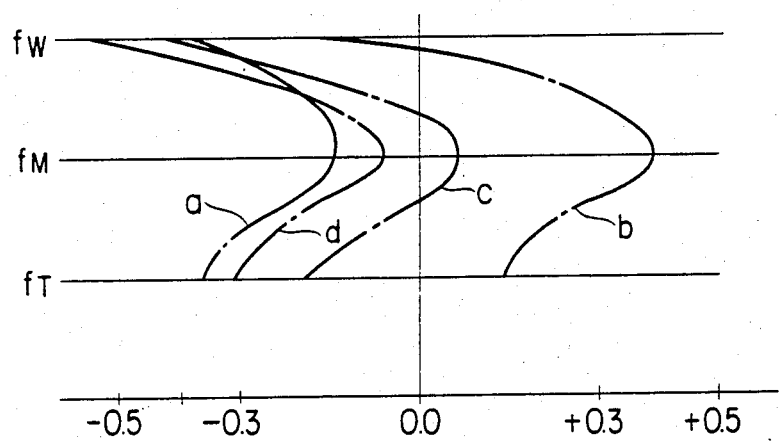
FIG. 9 shows the fluctuation of the meridional image plane at 70% of the angle of view by a magnification change and the fluctuation of the meridional image plane by the short distance in-focus in the fourth embodiment.

FIG. 9, like FIG. 8, shows the fluctuations of the meridional image plane at the 70% angle of view at the focal lengths of the wide angle end $f_W$, the medium portion $f_M$ and the telephoto end $f_T$ in the fourth embodiment. In FIG. 9, curve a represents the fluctuation by a magnification change in a case where the object is at infinity, and there occur inverted dog-legged fluctuations in which at the wide angle end, the image plane changes to under, at the medium portion, the image plane changes to over and at the telephoto end, the image plane changes to under, and in this case, this fluctuation difference is of the order of 0.3 and it is very difficult to decrease it. Generally, if an attempt is made to make the lens system compact, such a fluctuation component will increase. Curve b indicates the magnification change fluctuation in a case where only the first lens group has been moved by S=3.5 mm toward the object side and thereby focused to an object distance 1.4 m, and the difference between curves a and b, that is, the short distance fluctuation, is of the order of 0.4–0.5. In contrast, the magnification change fluctuations when the present invention in which the second lens group and the third lens group are moved toward the image side at the same time during the focusing to the same short distance object has been carried out are indicated by curves c and d. Curve c refers to a case where the second and third lens groups have been moved by $\Delta T = 0.5$ mm toward the image side, and it is approximate to curve a, and it is apparent that the short distance fluctuation is considerably corrected Curve d refers to a case where the second and third lens groups have been moved by $\Delta T = 0.7$ mm toward the image side, and it is seen that the short distance fluctuation is corrected better. However, if the short distance fluctuation is corrected any further, over-correction will occur at the wide angle end and the image performance will rather be deteriorated and therefore, it is necessary to choose an appropriate value within the range of the aforementioned condition (10).

Thus, effecting the correction according to the present invention is very effective in practice H; and the short distance fluctuation of the image plane is greatly improved and a good image performance can always be obtained in the entire area of the picture plane over the entire magnification change range.

Figure 10A:
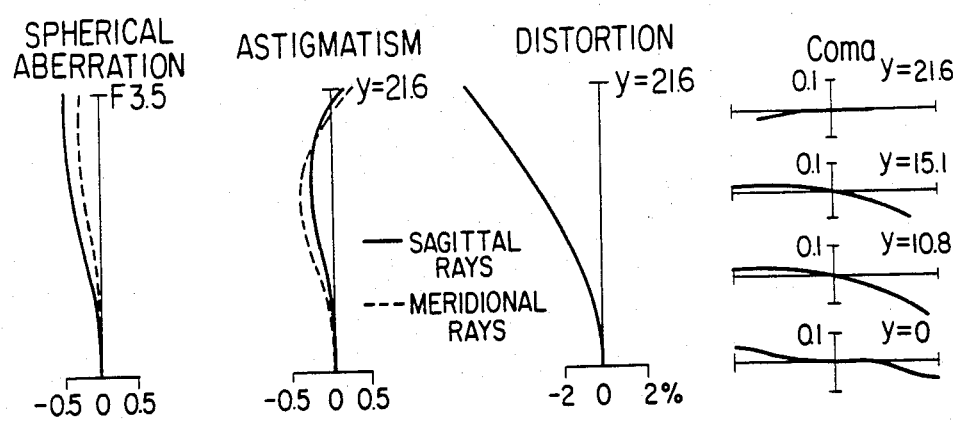
FIGS. 10A, 10B, 10C show the various aberrations in the infinity in-focus state of the first embodiment.
Figure 10B:
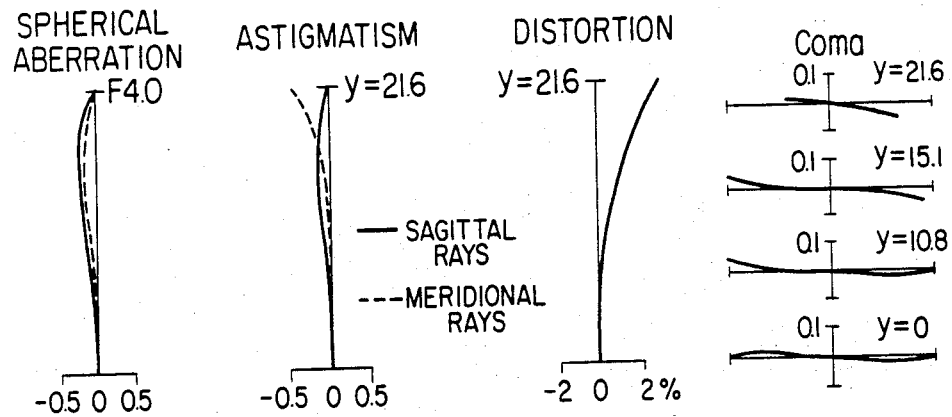
Figure 10C:
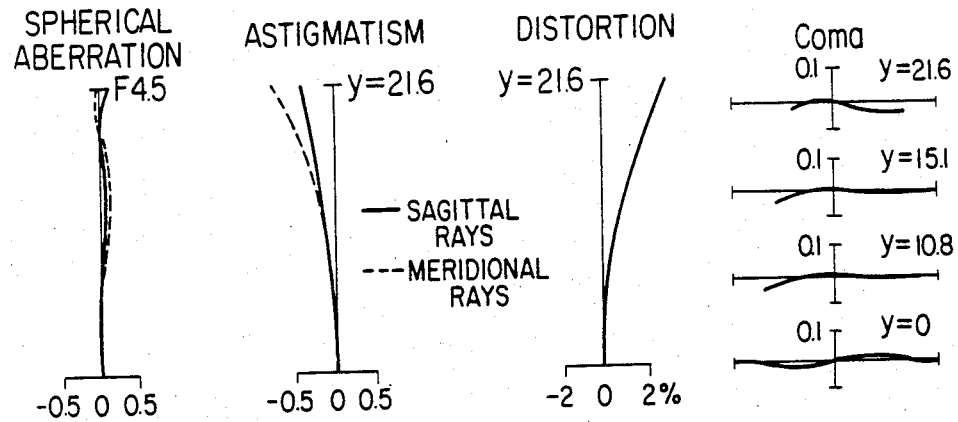
Figure 11A:
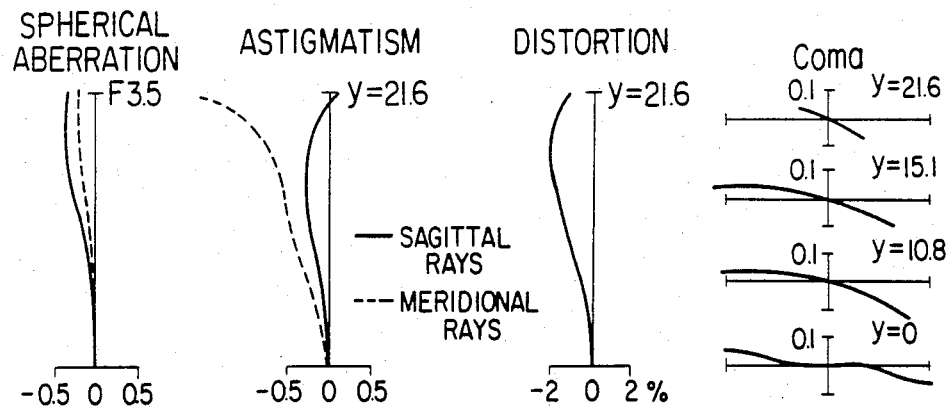
FIGS. 11A, 11B, 11C show the various aberrations in the short distance in-focus state of the first embodiment.
Figure 11B:
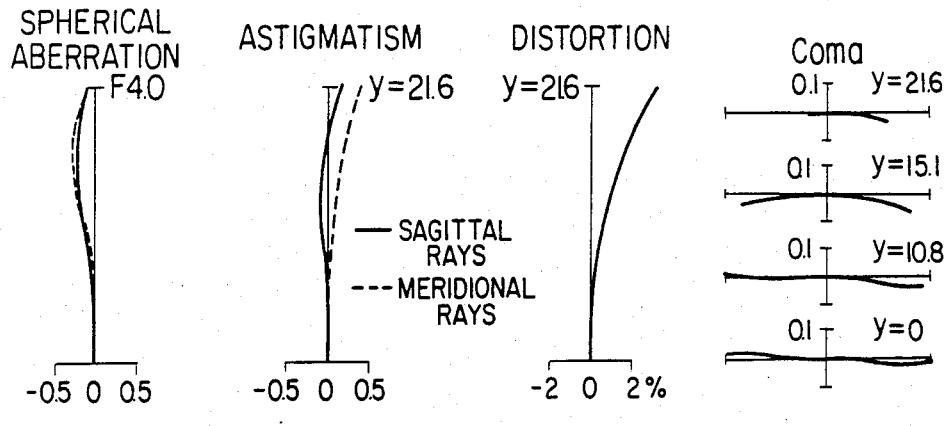
Figure 11C:
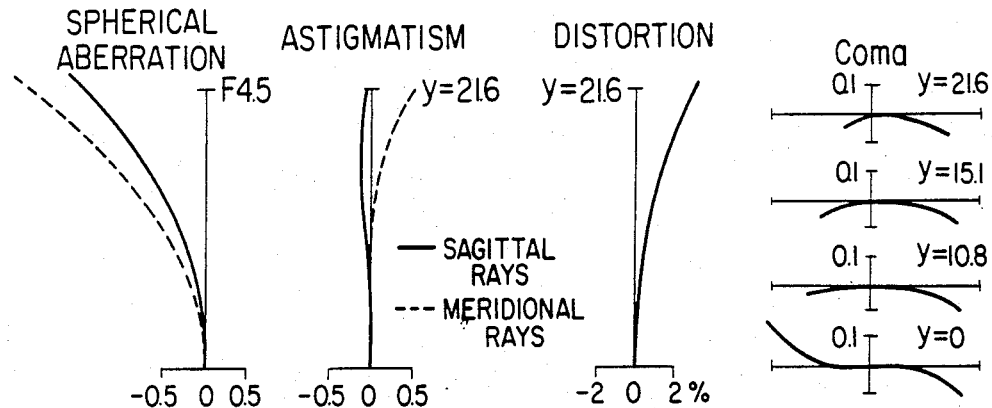
Figure 12A:
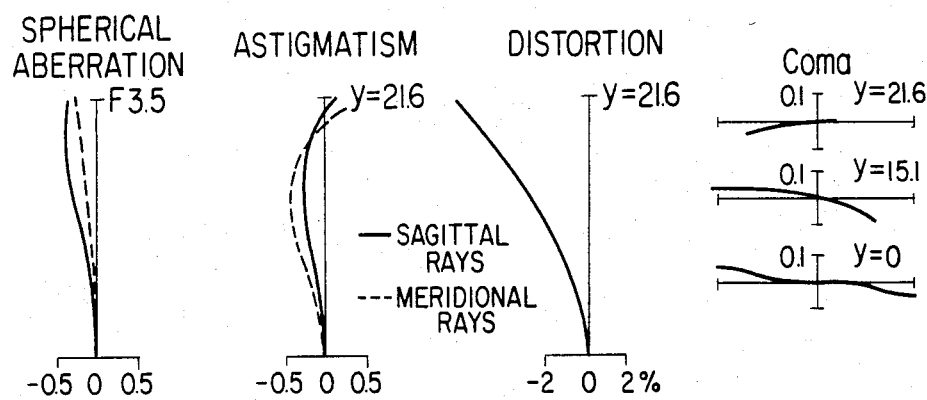
FIGS. 12A, 12B, 12C show the various aberrations in the infinity in-focus state of the second embodiment.
Figure 12B:
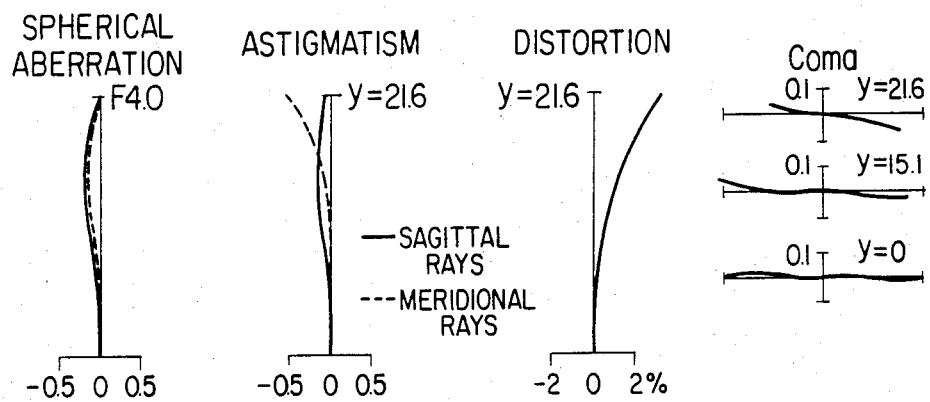
Figure 12C:
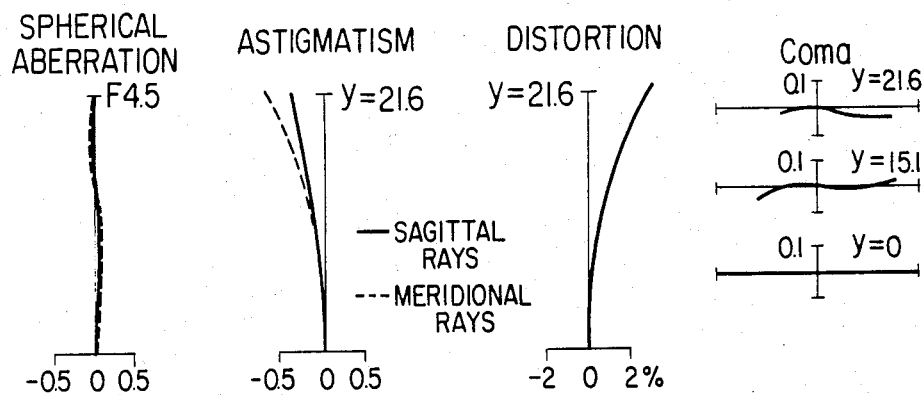
Figure 13A:
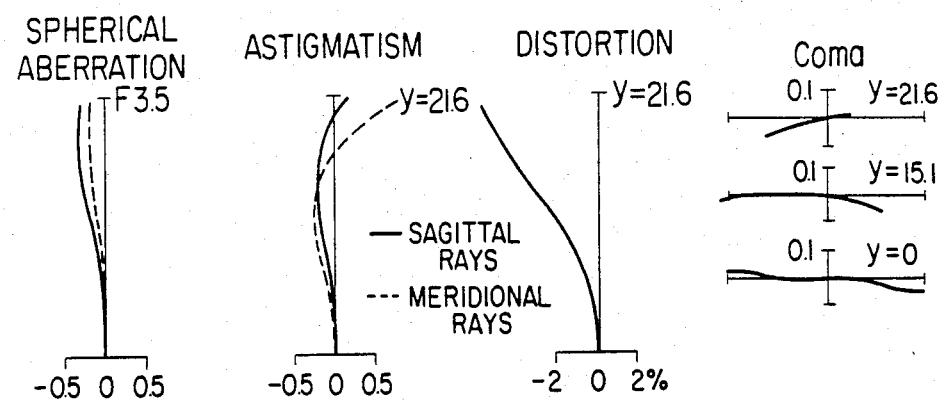
FIGS. 13A, 13B, 13C show the various aberrations in the infinity in-focus state of the third embodiment.
Figure 13B:
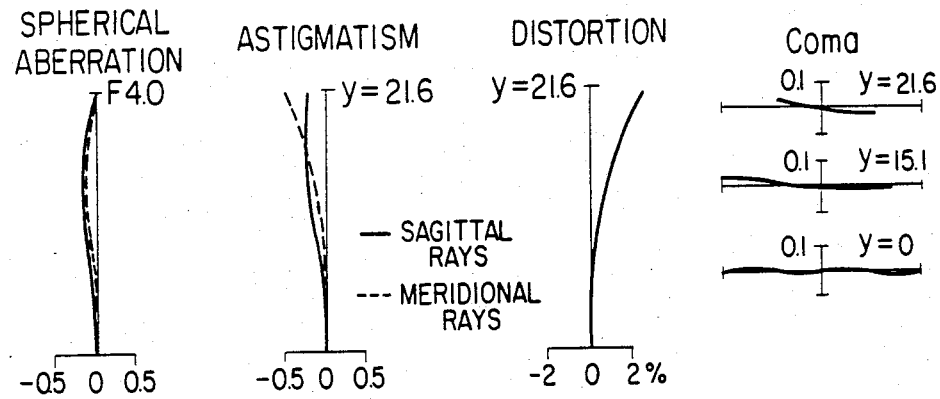
Figure 13C:
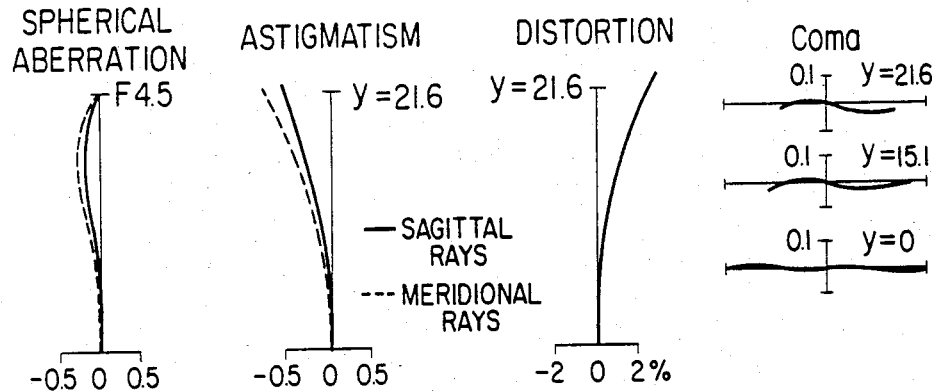
Figure 14A:
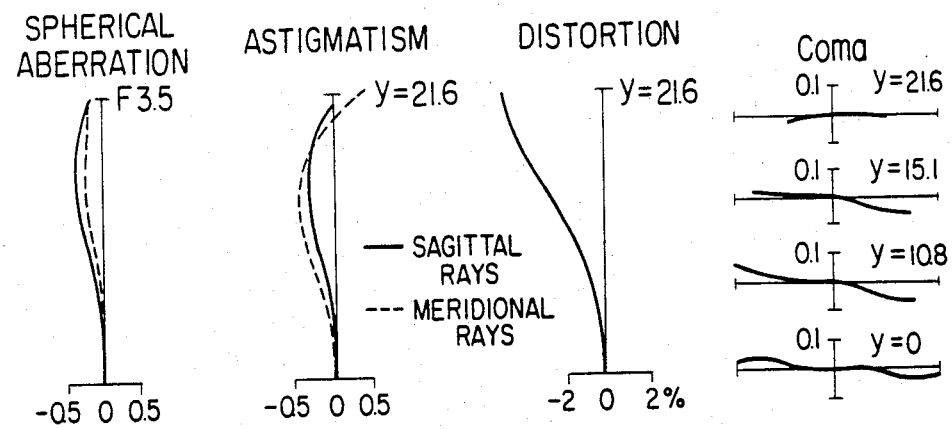
FIGS. 14A, 14B, 14C show the various aberrations in the infinity in-focus state of the fourth embodiment.
Figure 14B:
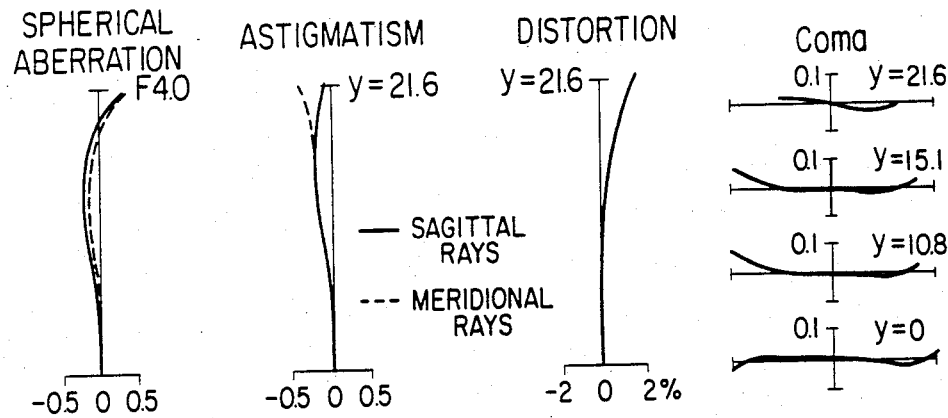
Figure 14C:
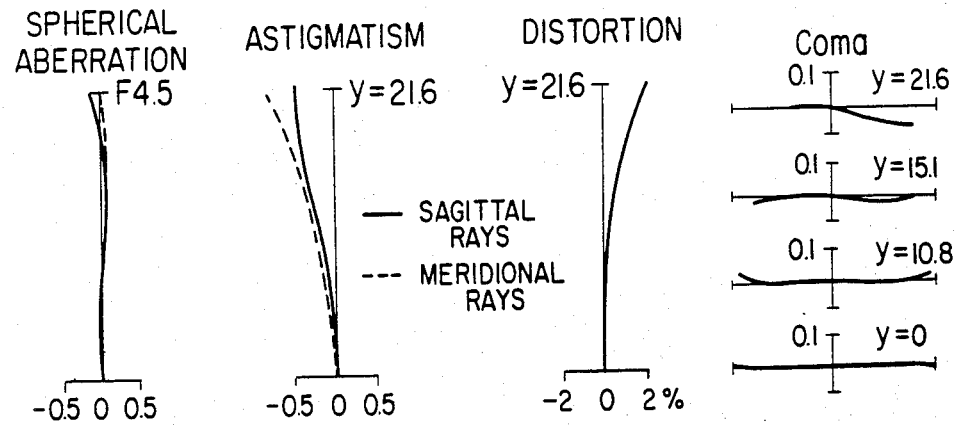
Figure 15A:
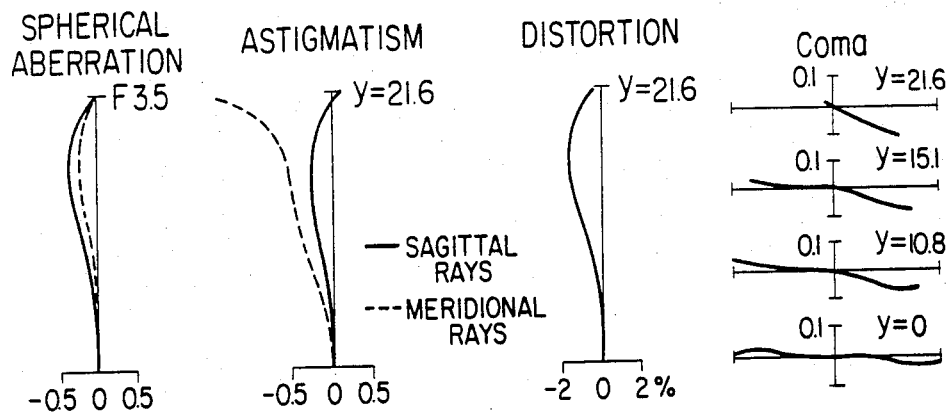
FIGS. 15A, 15B, 15C show the various aberrations in the short-distance in-focus state of the fourth embodiment.
Figure 15B:
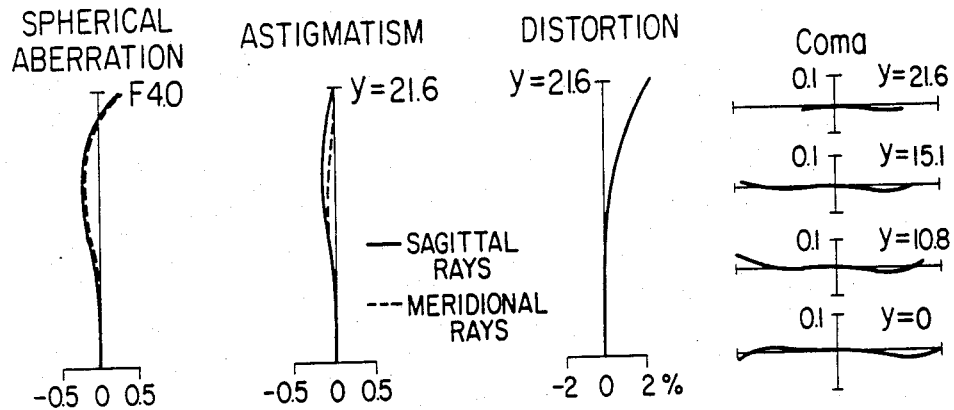
Figure 15C:
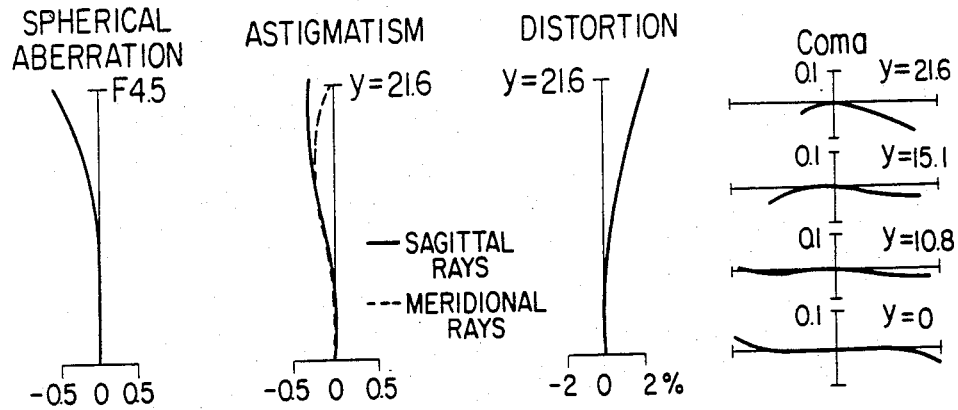

The various aberrations of the first embodiment during the infinity in-focus are shown in FIG. 10, the various aberrations of the first embodiment during the short distance in-focus (the object distance 1.6 m) are shown in FIG. 11, the various aberrations of the second and third embodiments during the infinity in-focus are shown in FIGS. 12 and 13, respectively, the various aberrations of the fourth embodiment during the infinity in-focus are shown in FIG. 14, and the various aberrations of the fourth embodiment during the short distance in-focus (the object distance 1.4 m) are shown in FIG. 15. In these aberration graphs, A represents the state of the wide angle end $f_W$, B represents the state of the medium portion $f_M$ and C represents the state of the telephoto end $f_T$, and each of them shows the spherical aberration, astigmatism, distortion and coma in the respective states. In the spherical aberration graphs, the offence of sine condition is indicated by dotted line.

From these aberration graphs, it is apparent that in each embodiment of the present invention, the various aberrations are connected well and particularly, improvements of the curvature of image field and astigmation at the medium portion and the telephoto end are remarkable and symmetry of coma is excellent and a practically sufficiently good performance is maintained although the astigmatism at the short distance is somewhat decrease at the wide angle end.

According to the present invention, as described above, there is achieved a zoom lens which includes a wide angle of view such as a maximum angle of view of 60° or more and has F-number of the order of 3.5 and a high magnification change rate of a zoom ratio of 3 to 5.7 times and yet is compact as a whole and has a an excellant imaging performance over the entire magnification change range and moreover in which aggravation of aberrations is small even during the short distance focusing. Moreover, in the focusing system according to the present invention, the second and third lens groups movable during a magnification change are moved together and this leads not only to the stability of aberrations but also to the structural advantage of the lens barrel, and the interval between the third lens group and the fourth lens group is a parallel light flux system and therefore, there is no variation in the back focal length during focusing, and the bad influence upon the other aberratrons other than curvature of image field can be suppressed, and this is very useful.

I claim:

1. A zoom lens including a wide angle of view and having a wide magnification change area, said zoom lens having, in succession from the object side, a first lens group of positive refractive power, a second lens group of negative refractive power, a third lens group of positive refractive power and a fourth lens group of positive refractive power and wherein when zooming is to be effected from the wide angle end to the telephoto end, said first lens group and said fourth lens group are monotonously moved toward the object side and at the same time, said third lens group is monotonously moved toward the object side by an amount of movement 0.4–0.8 as great as the amount of movement of said first and fourth lens groups and said second lens group is moved toward the object side in the vicinity of at least the wide angle end, said zoom lens satisfying the following condition:

$$4.5 < f_1/-f_2 < 6.5$$

where $f_1$ is the focal length of said first lens group and $f_2$ is the focal length of said second lens group.

2. A zoom lens according to claim 1, wherein numerical data are as follows:

Focal length f = 35~200  Zoom ratio 5.7  F-number 3.5~4.5  Image height y = 21.6

| | Radius of curvature | Center thickness and air space | | Refractive index | | Abbe number | | | |
|---|---|---|---|---|---|---|---|---|---|
| r1 | 219.97 | d1 | 1.3 | n1 | 1.805 | v1 | 25.4 | L1 | G1 |
| r2 | 69.27 | d2 | 8.0 | n2 | 1.498 | v2 | 82.3 | | |
| r3 | −129.41 | d3 | 0.1 | | | | | | |
| r4 | 50.60 | d4 | 4.0 | n3 | 1.797 | v3 | 45.5 | L2 | |
| r5 | 129.98 | d5 | (variable) | | | | | | |
| r6 | 121.12 | d6 | 1.3 | n4 | 1.903 | v4 | 35.8 | L3 | |
| r7 | 23.54 | d7 | 2.8 | | | | | | |
| r8 | 301.35 | d8 | 4.2 | n5 | 1.861 | v5 | 23.0 | L4 | G2 |
| r9 | −28.77 | d9 | 1.1 | n6 | 1.877 | v6 | 38.1 | | |
| r10 | 189.86 | d10 | 2.7 | | | | | | |
| r11 | −25.19 | d11 | 1.0 | n7 | 1.713 | v7 | 54.0 | L5 | |
| r12 | 32.36 | d12 | 2.8 | n8 | 1.861 | v8 | 23.0 | | |
| r13 | 682.84 | d13 | (variable) | | | | | | |
| r14 | −260.75 | d14 | 3.3 | n9 | 1.517 | v9 | 64.1 | L6 | |
| r15 | −41.85 | d15 | 0.1 | | | | | | |
| r16 | 37.74 | d16 | 4.5 | n10 | 1.519 | v10 | 70.1 | L7 | G3 |
| r17 | −59.29 | d17 | 1.0 | | | | | | |
| r18 | −41.97 | d18 | 1.0 | n11 | 1.861 | v11 | 23.0 | L8 | |
| r19 | −93.35 | d19 | (variable) | | | | | | |
| r20 | 74.81 | d20 | 3.0 | n12 | 1.517 | v12 | 64.1 | L9 | |
| r21 | −108.74 | d21 | 0.1 | | | | | | |
| r22 | 42.60 | d22 | 3.9 | n13 | 1.620 | v13 | 60.3 | L10 | |
| r23 | 86.90 | d23 | 7.0 | | | | | | |
| r24 | −103.53 | d24 | 2.0 | n14 | 1.796 | v14 | 41.0 | L11 | G4 |
| r25 | 37.43 | d25 | 2.5 | | | | | | |
| r26 | −253.20 | d26 | 2.5 | n15 | 1.517 | v15 | 64.1 | L12 | |
| r27 | −49.39 | d27 | 0.1 | | | | | | |
| r28 | 81.93 | d28 | 6.5 | n16 | 1.518 | v16 | 59.0 | L13 | |
| r29 | −23.95 | d29 | 1.0 | n17 | 1.788 | v17 | 47.5 | | |
| r30 | −45.57 | Bf | | | | | | | |

| | $f_W$ = 36.12 | $f_M$ = 84.0 | $f_T$ = 193.96 |
|---|---|---|---|
| d5 | 2.30 | 21.71 | 36.79 |
| d13 | 18.92 | 9.25 | 0.54 |

|  |  |  |  |
|---|---|---|---|
| d19 | 19.11 | 9.37 | 3.00 |
| Stop: ahead of $L_9$ | 0.8 | 0.8 | 0.8 |
| Back focal length: Bf | 53.15 | 78.12 | 94.41 | where the values are shown in succession from the object side and the suffix numbers represent the order from the object side.

3. A zoom lens according to claim 1, wherein numerical data are as follows:

where the values are shown in succession from the object side and the suffix numbers represent the order from the object side.

4. A zoom lens according to claim 1, wherein numerical data are as follows:

| Focal length f = 35~200  Zoom ratio 5.7  F-number 3.5~4.5  Image height y = 21.6 ||||||||
|---|---|---|---|---|---|---|---|
| Radius of curvature || Center thickness and air space || Refractive index | Abbe number |||
| r1 | 158.9 | d1 | 1.5 | n1 | 1.805 $\nu$1 | 25.4 $\}$ $L_1$ | $\}$ $G_1$ |
| r2 | 64.1 | d2 | 3.0 | n2 | 1.498 $\nu$2 | 82.3 | |
| r3 | −138.8 | d3 | 0.1 | | | | |
| r4 | 47.2 | d4 | 4.3 | n3 | 1.670 $\nu$3 | 47.1  $L_2$ | |
| r5 | 127.2 | d5 | (variable) | | | | |
| r6 | 133.1 | d6 | 1.3 | n4 | 1.903 $\nu$4 | 35.8  $L_3$ | |
| r7 | 23.6 | d7 | 2.9 | | | | |
| r8 | 154.6 | d8 | 4.2 | n5 | 1.805 $\nu$5 | 25.4 $\}$ $L_4$ | $\}$ $G_2$ |
| r9 | −32.5 | d9 | 1.1 | n6 | 1.804 $\nu$6 | 46.4 | |
| r10 | 117.2 | d10 | 2.7 | | | | |
| r11 | −25.4 | d11 | 1.0 | n7 | 1.713 $\nu$7 | 54.0 $\}$ $L_5$ | |
| r12 | 30.8 | d12 | 2.8 | n8 | 1.861 $\nu$8 | 23.0 | |
| r13 | 483.9 | d13 | (variable) | | | | |
| r14 | −486.8 | d14 | 3.3 | n9 | 1.517 $\nu$9 | 64.1  $L_6$ | |
| r15 | −39.4 | d15 | 0.1 | | | | |
| r16 | 36.2 | d16 | 4.5 | n10 | 1.519 $\nu$10 | 70.1  $L_7$ | $\}$ $G_3$ |
| r17 | −84.7 | d17 | 0.8 | | | | |
| r18 | −47.7 | d18 | 1.0 | n11 | 1.861 $\nu$11 | 23.0  $L_8$ | |
| r19 | −121.8 | d19 | (variable) | | | | |
| r20 | 72.5 | d20 | 3.0 | n12 | 1.517 $\nu$12 | 64.1  $L_9$ | |
| r21 | −115.7 | d21 | 0.1 | | | | |
| r22 | 46.8 | d22 | 3.9 | n13 | 1.620 $\nu$13 | 60.3  $L_{10}$ | |
| r23 | 107.7 | d23 | 7.0 | | | | |
| r24 | −89.7 | d24 | 2.0 | n14 | 1.796 $\nu$14 | 41.0  $L_{11}$ | $\}$ $G_4$ |
| r25 | 37.6 | d25 | 2.5 | | | | |
| r26 | −298.2 | d26 | 2.5 | n15 | 1.567 $\nu$15 | 64.1  $L_{12}$ | |
| r27 | −47.4 | d27 | 0.1 | | | | |
| r28 | 93.5 | d28 | 6.5 | n16 | 1.518 $\nu$16 | 60.3 $\}$ $L_{13}$ | |
| r29 | −24.6 | d29 | 1.3 | n17 | 1.788 $\nu$17 | 47.5 | |
| r30 | −43.4 | Bf | | | | | |
| | | $f_W$ = 36.1 | | $f_M$ = 84.0 | | $f_T$ = 194.0 | |
| d5 | | 1.27 | | 20.68 | | 35.76 | |
| d13 | | 19.27 | | 9.60 | | 0.89 | |
| d19 | | 17.34 | | 7.60 | | 1.23 | |
| Stop: ahead of $L_9$ || 0.8 | | 0.8 | | 0.8 | |
| Back focal length: Bf || 54.2 | | 79.17 | | 95.46 | |

| Focal length f = 35~200  Zoom ratio 5.7  F-number 3.5~4.5  Image height y = 21.6 ||||||||
|---|---|---|---|---|---|---|---|
| Radius of curvature || Center thickness and air space || Refractive index | Abbe number |||
| r1 | 268.4 | d1 | 1.3 | n1 | 1.805 $\nu$1 | 25.4 $\}$ $L_1$ | $\}$ $G_1$ |
| r2 | 69.1 | d2 | 7.5 | n2 | 1.498 $\nu$2 | 82.3 | |
| r3 | −122.2 | d3 | 0.1 | | | | |
| r4 | 49.8 | d4 | 3.6 | n3 | 1.840 $\nu$3 | 43.3  $L_2$ | |
| r5 | 122.4 | d5 | (variable) | | | | |
| r6 | 101.9 | d6 | 0.9 | n4 | 1.903 $\nu$4 | 35.8  $L_3$ | |
| r7 | 24.4 | d7 | 3.4 | | | | |
| r8 | 153.4 | d8 | 4.4 | n5 | 1.861 $\nu$5 | 23.0 $\}$ $L_4$ | $\}$ $G_2$ |
| r9 | −21.9 | d9 | 0.9 | n6 | 1.877 $\nu$6 | 38.1 | |
| r10 | 88.3 | d10 | 3.1 | | | | |
| r11 | −25.5 | d11 | 0.9 | n7 | 1.744 $\nu$7 | 45.1 $\}$ $L_5$ | |
| r12 | 38.5 | d12 | 3.7 | n8 | 1.861 $\nu$8 | 23.0 | |
| r13 | −591.6 | d13 | (variable) | | | | |
| r14 | −4145.0 | d14 | 3.8 | n9 | 1.498 $\nu$9 | 82.3  $L_6$ | |

-continued

| | | | | | | | | | |
|---|---|---|---|---|---|---|---|---|---|
| r15 | −40.1 | d15 | 0.1 | | | | | | |
| r16 | 36.3 | d16 | 4.1 | n10 | 1.498 | ν10 | 82.3 | L7 | G3 |
| r17 | −114.4 | d17 | 1.5 | | | | | | |
| r18 | −44.1 | d18 | 1.0 | n11 | 1.861 | ν11 | 23.0 | L8 | |
| r19 | −80.9 | d19 | (variable) | | | | | | |
| r20 | 119.0 | d20 | 1.3 | n12 | 1.767 | ν12 | 46.8 | L9 | |
| r21 | 37.3 | d21 | 4.2 | n13 | 1.517 | ν13 | 64.1 | | |
| r22 | −79.6 | d22 | 0.1 | | | | | | |
| r23 | 36.9 | d23 | 4.5 | n14 | 1.620 | ν14 | 60.3 | L10 | |
| r24 | 0.0 | d24 | 7.0 | | | | | | G4 |
| r25 | −96.8 | d25 | 1.0 | n15 | 1.773 | ν15 | 49.4 | L11 | |
| r26 | 34.9 | d26 | 4.2 | | | | | | |
| r27 | −179.9 | d27 | 3.4 | n16 | 1.518 | ν16 | 60.3 | L12 | |
| r28 | −41.3 | d28 | 0.1 | | | | | | |
| r29 | 66.8 | d29 | 8.0 | n17 | 1.518 | ν17 | 58.9 | L13 | |
| r30 | −34.5 | d30 | 1.0 | n18 | 1.797 | ν18 | 45.5 | | |
| r31 | −103.5 | Bf | | | | | | | |

| | $f_W = 36.1$ | $f_M = 84.0$ | $f_T = 194.0$ |
|---|---|---|---|
| d5 | 2.46 | 21.87 | 36.95 |
| d13 | 18.37 | 8.70 | −0.01 |
| d19 | 19.08 | 9.34 | 2.97 |
| Stop: ahead of L9 | 0.8 | 0.8 | 0.8 |
| Back focal length: Bf | 48.53 | 73.50 | 89.79 | where the values are shown in succession from the object side and the suffix numbers represent the order from the object side.

5. A zoom lens according to claim 1, wherein said first lens group has a positive first lens component comprising a negative meniscus lens and a biconvex positive lens cemented together, and a second lens component which is a positive meniscus lens having its convex surface facing the object side.

6. A zoom lens according to claim 5, satisfying the following condition:

$$80 < \nu_2,$$

where $\nu_2$ is the Abbe number of the positive lens forming the cemented first lens component in said first lens group.

7. A zoom lens according to claim 1, wherein said second lens group has, in succession from the object side, a third lens component which is a negative meniscus lens having its convex surface facing the object side, a fourth lens component which is a cemented negative lens component, and a fifth lens component which is a negative lens comprising cemented lenses and having its surface of sharper curvature facing the object side.

8. A zoom lens according to claim 7, satisfying the following conditions:

$$n_5 > 1.8 \quad n_6 > 1.8,$$

where $n_5$ and $n_6$ are the refractive indices of the positive lens and the negative lens, respectively, forming the fourth lens component as the cemented negative lens in said second lens group.

9. A zoom lens according to claim 1, wherein said third lens group has, in succession from the object side, a sixth lens component which is a positive lens having its surface of sharper curvature facing the image side, a seventh lens component which is a biconvex positive lens, and an eighth lens component which is a negative meniscus lens having its convex surface facing the image side.

10. A zoom lens according to claim 9, satisfying the following condition:

$$-3.6 < q_6 < -0.5,$$

where $q_6$ is the shape factor of the sixth lens component of said third lens group which is positioned most adjacent to the object side and the shape factor q is defined by $$q = \frac{rb + ra}{rb - ra},$$

where ra and rb are the radii of curvature of the lens surfaces of that lens which are adjacent to the object side and the image side, respectively.

11. A zoom lens according to claim 1, wherein said fourth lens group has a ninth lens component which is a biconvex positive lens, a tenth lens component which is a positive lens having its surface of sharper curvature facing the object side, an eleventh lens component which is a biconcave lens having its surface of sharper curvature facing the image side, a twelfth lens component which is a positive lens having its surface of sharper curvature facing the image side, and a thirteenth lens component which is a positive lens comprising a biconvex positive lens and a negative meniscus lens having its convex surface facing the image side cemented together.

12. A zoom lens according to claim 11, satisfying the following conditions:

$$0.5 < q_{10} < 5 \quad -1 < q_{11} < 0.0,$$

where $q_{10}$ and $q_{11}$ are the shape factors of the tenth lens component and the eleventh lens component, respectively, in said fourth lens group and the shape factor q is defined by $$q = \frac{rb + ra}{rb - ra},$$

where ra and rb are the radii of curvature of the lens surfaces of that lens which are adjacent to the object side and the image side, respectively.

13. A zoom lens including a wide angle of view, said zoom lens having, in succession from the object side, a first lens group of positive refractive power, a second lens group of negative refractive power, a third lens group of positive refractive power and a fourth lens group of positive refractive power, said first, second and third lens groups together forming a substantially afocal system, characterized in that when the zoom lens is to be focused to a short distance object, said first lens group is moved toward the object side along the optic axis relative to the image plane and said second lens group and said third lens group are moved together toward the image side along the optic axis.

14. A zoom lens according to claim 13, satisfying the following condition:

$$0.1\,S \leqq \Delta T \leqq 0.35\,S,$$

where S is the amount of movement of said first lens group for focusing and $\Delta T$ is the amount of integral movement of said second lens group and said third lens group.

15. A zoom lens according to claim 14, wherein numerical data are as follows:

TABLE 4

| Focal length f = 35~105 | | Zoom ratio 3 | | F-number 3.5~4.5 | | Image height y = 21.6 | | |
|---|---|---|---|---|---|---|---|---|
| | Radius of curvature | | Center thickness and air space | | Refractive index | | Abbe number | |
| r1 | 150.69 | d1 | 1.3 | n1 | 1.805 | ν1 | 25.3 | L1 ⎫ |
| r2 | 58.13 | d2 | 0.4 | | | | | ⎪ |
| r3 | 66.23 | d3 | 6.2 | n2 | 1.603 | ν2 | 60.6 | L2 ⎬ G1 |
| r4 | −128.09 | d4 | 0.1 | | | | | ⎪ |
| r5 | 33.14 | d5 | 3.9 | n3 | 1.603 | ν3 | 60.6 | L3 ⎭ |
| r6 | 67.54 | d6 | (variable) | | | | | |
| r7 | 62.79 | d7 | 1.0 | n4 | 1.796 | ν4 | 45.5 | L4 ⎫ |
| r8 | 17.07 | d8 | 3.0 | | | | | ⎪ |
| r9 | −213.87 | d9 | 3.5 | n5 | 1.805 | ν5 | 25.3 ⎫ | ⎪ |
| | | | | | | | | L5 ⎬ G2 |
| r10 | −20.49 | d10 | 1.0 | n6 | 1.796 | ν6 | 45.5 ⎭ | ⎪ |
| r11 | −194.15 | d11 | 2.7 | | | | | ⎪ |
| r12 | −21.48 | d12 | 1.0 | n7 | 1.713 | ν7 | 53.9 ⎫ | ⎪ |
| | | | | | | | | L6 ⎭ |
| r13 | 17.23 | d13 | 3.5 | n8 | 1.796 | ν8 | 40.9 ⎭ | |
| r14 | −696.58 | d14 | (variable) | | | | | |
| r15 | 122.05 | d15 | 4.0 | n9 | 1.713 | ν9 | 53.9 | L7 ⎫ |
| r16 | −24.80 | d16 | 0.4 | | | | | ⎪ |
| r17 | −21.54 | d17 | 1.0 | n10 | 1.805 | ν10 | 25.3 | L8 ⎬ G3 |
| r18 | −38.91 | d18 | 0.1 | | | | | ⎪ |
| r19 | 35.07 | d19 | 2.0 | n11 | 1.568 | ν11 | 56.0 | L9 ⎭ |
| r20 | 72.08 | d20 | (variable) | | | | | |
| r21 | 21.96 | d21 | 4.0 | n12 | 1.563 | ν12 | 60.8 ⎫ | |
| | | | | | | | | L10 ⎫ |
| r22 | 34.58 | d22 | 1.5 | n13 | 1.796 | ν13 | 45.5 ⎭ | ⎪ |
| r23 | 20.50 | d23 | 2.0 | | | | | ⎪ |
| r24 | 104.25 | d24 | 4.0 | n14 | 1.518 | ν14 | 60.3 | L11 ⎬ G4 |
| r25 | −31.38 | d25 | 0.1 | | | | | ⎪ |
| r26 | −95.95 | d26 | 5.5 | n15 | 1.563 | ν15 | 60.8 ⎫ | ⎪ |
| | | | | | | | | L12 ⎭ |
| r27 | −16.37 | d27 | 1.4 | n16 | 1.796 | ν16 | 40.9 ⎭ | |
| r28 | −45.88 | Bf | | | | | | |
| | | | $f_W = 36.2$ | | $f_M = 60$ | | $f_T = 103$ | |
| | d6 | | 0.98 | | 10.62 | | 19.77 | |
| | d14 | | 12.52 | | 6.77 | | 1.49 | |
| | d20 | | 10.84 | | 6.96 | | 3.08 | |
| | Stop: ahead of L9 | | 0.8 | | 0.8 | | 0.8 | |
| | Back focal length: Bf | | 52.36 | | 65.30 | | 78.24 | | where the values are shown in succession from the object side and the suffix numbers represent the order from the object side.

* * * * *